United States Patent
Li et al.

(10) Patent No.: US 7,133,444 B2
(45) Date of Patent: Nov. 7, 2006

(54) COMBINED EQUALIZATION FOR DMT-BASED MODEM RECEIVER

(75) Inventors: Xiaohui Li, College Station, TX (US); Mark A. Curry, San Jose, CA (US)

(73) Assignee: Texas Instruments Incorporated, Dallas, TX (US)

( * ) Notice: Subject to any disclaimer, the term of this patent is extended or adjusted under 35 U.S.C. 154(b) by 839 days.

(21) Appl. No.: 10/229,652

(22) Filed: Aug. 28, 2002

(65) Prior Publication Data
US 2004/0042543 A1    Mar. 4, 2004

(51) Int. Cl.
H04B 7/00 (2006.01)
H04B 1/38 (2006.01)
H03K 7/00 (2006.01)
H04L 27/28 (2006.01)

(52) U.S. Cl. .................. 375/222; 375/229; 375/260; 455/702; 455/701

(58) Field of Classification Search .................. None
See application file for complete search history.

(56) References Cited

U.S. PATENT DOCUMENTS 6,219,378 B1 * 4/2001 Wu ............................ 375/231

OTHER PUBLICATIONS

"Equalization for DMT-based Broadband Modems", Pollet et al, IEEE Communications Magazine, May 2000, pp. 106-113.*
Van Acker, et al., "Per Tone Equalization for DMT-Based Systems", IEEE Trans. Comm., vol. 49, No. 1 (Jan. 2001) pp. 109-119.

* cited by examiner

*Primary Examiner*—Kevin Kim
*Assistant Examiner*—Linda Wong
(74) *Attorney, Agent, or Firm*—Steven A. Shaw; W. James Brady; Frederick J. Telecky, Jr.

(57) ABSTRACT

A DMT modem (40) is disclosed, in which a combined time domain equalizer and per-tone equalizer is applied to a received DMT signal. The combined equalizer includes a first FFT function (44) that is applied to a set of samples in a time-domain signal after the application of a time domain equalizer (42). The first FFT function (44) produces an initial FFT result, that is accumulated with a sliding FFT (46) performed upon difference values in the time domain samples. The sliding FFT results are applied to a per-ton equalizer (48) which applies a set of complex coefficients determined in training of the modem. A simple 1-tap FEQ (50) then can recover the signal. The combined equalizer enables per-tone equalization, in a manner that is compatible with conventional DSL training standards. According to a second embodiment, the per-tone equalization is performed only on selected tones of the multitone signal.

18 Claims, 9 Drawing Sheets

COMBINED EQUALIZATION FOR DMT-BASED MODEM RECEIVER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is in the field of communications, and is more specifically directed to multicarrier modulation communications, such as Digital Subscriber Line (DSL) communications.

An important and now popular modulation standard for DSL communication is Discrete Multitone (DMT). According to DMT technology, the available spectrum is subdivided into many subchannels (e.g., 256 subchannels of 4.3125 kHz). Each subchannel is centered about a carrier frequency that is phase and amplitude modulated, typically by Quadrature Amplitude Modulation (QAM), in which each symbol value is represented by a point in the complex plane. The number of available symbol values for each subchannel, and thus the number of bits in each symbol communicated over that subchannel, is determined during initialization of the DMT communications session. The number of bits per symbol for each subchannel (i.e., the "bit loading") is determined according to the signal-to-noise ratio (SNR) at the subchannel frequency, which is affected by the transmission channel noise and the signal attenuation at that frequency. For example, relatively noise-free and low attenuation subchannels may communicate data in ten-bit to fifteen-bit symbols, represented by a relatively dense QAM constellation with short distances between points in the constellation. On the other hand, noisy channels may be limited to only two or three bits per symbol, allowing a greater distance between adjacent points in the QAM constellation. Indeed, the SNR of some subchannels is so poor that these subchannels are unloaded, carrying no bits. DMT modulation thus maximizes the data rate over each subchannel, permitting high speed access to be carried out even over relatively noisy and attenuated twisted-pair lines.

DMT modulation also permits much of the signal processing to be carried out in the digital domain. Typically, a serial digital datastream to be transmitted is arranged into symbols, one for each subchannel, with the symbol size depending on the bit loading, as noted above. Reed-Solomon coding and other coding techniques are typically applied for error detection and correction. Modulation of the subchannel carriers is obtained by application of an inverse Discrete Fourier Transform (IDFT) to the encoded symbols, producing a discrete modulated time domain signal having signal components at each of the subcarrier frequencies. This modulated signal is then serially transmitted. All of these DMT modulation operations can be carried out in the digital domain, permitting implementation of much of a DSL modem, and particularly much of the processing-intensive operations, in a single chip such as a Digital Signal Processor (DSP).

The discrete output time domain signal from the modulation is converted into a time-domain analog signal by a conventional digital-to-analog converter, and is communicated over the transmission channel to the receiving modem, which reverses the process to recover the transmitted data. Ideally, the DMT subchannels in the received signal are orthogonal so that the signal can be demodulated by a Discrete Fourier Transform (DFT).

However, the non-ideal impulse response of the transmission channel distorts the transmitted signal. The signal received by the receiving modem can be considered to be a convolution of the transmitted analog signal with the impulse response of the transmission channel. One may express the time-domain signal y(n) at the receiver, based on a transmitted time-domain signal x(n), as:

$$y(n)=x(n)h(n)$$

This expression simply states that the received signal y(n) is the time-domain convolution of the input signal x(n) with the channel impulse response h(n). In the ideal case, this time-domain expression can be expressed in the frequency-domain as:

$$Y(n)=X(n) \cdot H(n)$$

where X(n), H(n), and Y(n) are the respective frequency-domain representations of time-domain signals x(n), h(n), y(n). Considering that the transmitted signal x(n) is the IDFT of the symbol sequences at their respective subchannel frequencies, the frequency-domain spectrum X(n) corresponds to the symbols themselves. According to the DMT modulation technology, the receiver can therefore retrieve the symbols X(n) by removing the channel response H(n) from the DFT of the frequency-domain received signal Y(n). Conventionally, this is performed by a single-tap frequency domain equalizer.

However, time domain convolution corresponds to frequency domain multiplication only if the input sequence is infinitely long, or if the input sequence is periodic. Because the number of subchannels is finite, however, the number of real-valued time-domain samples at the output of the transmitter IDFT (i.e., the "block" length) is also finite. Accordingly, it is useful to make the transmitted signal appear to be periodic, at a period on the order of the block length. A well-known technique for accomplishing this is to include a cyclic prefix with each transmitted block in the datastream. The cyclic prefix is generally defined as a number P of samples at the end of a block of samples in the output bitstream. These P samples are prepended to the block, prior to digital-to-analog conversion, so that the transmitted signal appears periodic. This apparent periodicity in the input sequence permits the use of a DFT to recover the modulating symbols in each subchannel, so long as the impulse response of the transmission channel, commonly referred to as the channel length, is less than the length of the cyclic prefix.

In effect, the cyclic prefix eliminates inter-symbol interference (ISI) between adjacent data frames, and inter-carrier interference (ICI) among subchannels. ISI generally arises from distortion and spreading of the transmitted signal over the channel, causing the end of one DMT symbol to overlap into the beginning of the next DMT symbol. ICI affects the independence of the subcarriers, resulting in loss of orthogonality among the subchannels, which in turn prevents separation of the modulating data on these subchannels at the receiver.

In order for the input sequence to appear periodic, so that ISI is contained within the redundant prefix of the block, the cyclic prefix must be longer than the channel length. However, this causes the effective data rate of the transmission to be reduced accordingly. In the case of a signal with a block length of N samples and a cyclic prefix of P samples generated by prepending a copy of the last P samples of the block, the data rate is reduced by the factor:

$$\frac{N}{N+P}$$

This presents a tradeoff between interference and data rate in conventional DMT communications.

FIG. 1 functionally illustrates an example of a conventional DSL communication system. In the system of FIG. 1, only one direction of transmission (from transmitting modem 10 over transmission channel H to receiving modem 20) is illustrated. It will of course be understood by those skilled in the art that data will also be communicated in the opposite direction, in which case modem 20 will be the transmitting modem and modem 10 the receiving modem.

Transmitting modem 10 receives an input bitstream that is to be transmitted to receiving modem 20. This input bitstream may be generated by a computer at the same location (e.g., the central office) as transmitting modem 10, or alternatively and more likely is generated by a computer network, in the Internet sense, that is coupled to transmitting modem 10. The input bitstream is a serial stream of binary digits, in the appropriate format as produced by the data source.

Bit-to-symbol encoder function 11 in transmitting modem 10 groups the bits of the input bitstream into multiple-bit symbols, according to the bit loading assigned to each subchannel in the initialization of the communication session. These symbols will modulate the various subchannels of the DMT signal. Optionally, error correction coding, such as Reed-Solomon coding for error detection and correction purposes, or trellis coding, may also be applied at encoder 11 for additional signal-to-noise ratio improvement.

The symbols generated by encoder function 11 are typically complex symbols, including both amplitude and phase information, and correspond to points in the appropriate modulation constellation (e.g., quadrature amplitude modulation, or QAM) for each subchannel, as determined upon initialization. The encoded symbols for each block are then applied to inverse Discrete Fourier Transform (IDFT) function 12. IDFT function 12 associates each input symbol with one subchannel in the transmission frequency band, and generates a corresponding number of time domain symbol samples according to the Fourier transform. These time domain symbol samples are then converted into a serial stream of samples by parallel-to-serial converter 13. Typically, if N/2 complex symbols are presented to IFFT function 12, IFFT function 12 outputs a block of N real-valued time domain samples. Those skilled in the art having reference to this specification will readily recognize that each of functions 11 through 13 may be carried out, and preferably actually are carried out, as digital operations executed by a digital signal processor (DSP).

In function 14, the cyclic prefix (CP) is then added into the signal, typically by prepending the last v samples of each frame to the beginning of that frame, as discussed above. Digital filtering function 15 then processes the datastream, by interpolating to increase the sample rate, digital low pass filtering to remove image components, and digital high pass filtering to eliminate POTS-band interference. The digitally-filtered datastream signal is converted to analog by digital-to-analog converter 16, and low-pass filtered by analog filtering function 18, prior to transmission. As described in U.S. Pat. No. 6,226,322, commonly assigned herewith and incorporated herein by this reference, digital filter function 15, digital-to-analog converter 16, and analog filter function 18 are preferably implemented in a conventional codec circuit, such as a member of the TLV320AD1x device family available from Texas Instruments Incorporated.

The output of analog filter 18 is then forwarded to transmission channel H and in turn to receiving modem 20 by conventional line driver and receiver circuitry, such as the THS7102 line driver/receiver available from Texas Instruments Incorporated, and by a conventional hybrid circuit. In the case of ADSL communications, transmission channel H is physically realized by twisted-pair wire. The significant distortion and noise added to the transmitted analog signal by transmission channel H is represented by its impulse response h(n), as described above.

The downstream transmitted signal is received by receiving modem 20, which, in general, reverses the processes of transmitting modem 10 to recover the information of the input bitstream. As shown in FIG. 1, analog filter function 21 processes the received signal prior to analog-to-digital conversion function 22, which converts the filtered analog signal to digital. Conventional digital filtering function 23 is then applied to augment the function of the analog filters. The combination of analog and digital filter functions 21, 23 also preferably includes some frequency band filtering to isolate the received signal from signals currently being transmitted upstream by modem 20.

In this conventional arrangement, time domain equalizer (TEQ) 24 is preferably a finite impulse response (FIR) digital filter, designed to effectively shorten the length of the impulse response of the transmission channel H, taking into account the filtering performed by functions 21, 23. The design of this digital filter is realized by the selection of the particular coefficients of the FIR implementing TEQ function 24 during initialization, or "training", of the combination of modems 10 and 20 as the communications session is established. The cyclic prefix is then removed by function 25. Serial-to-parallel converter 26 converts the filtered datastream into a number of samples for application to Discrete Fourier Transform (DFT) function 27. Because the received signal is a time-domain superposition of the modulated subchannels, DFT function 27 will recover the modulating symbols at each of the subchannel frequencies, reversing the IDFT performed by function 12 in transmitting modem 10 to produce a frequency domain representation of a block of transmitted symbols, multiplied by the frequency-domain response of the effective transmission channel. The cyclic prefix of the data frame is at least as long as the channel response h(t), shortened by TEQ function 24. Based on this assumption, frequency-domain equalization (FEQ) function 28 divides out the frequency-domain response of the effective channel, and recovers an estimate of the modulating symbols. Symbol-to-bit decoder function 29 then resequences the recovered symbols, decodes any encoding that was applied in the transmission of the signal, and produces an output bitstream that is an estimate of the input bitstream upon which the transmission was based. This output bitstream is then forwarded to a client workstation or other recipient.

As noted above, time domain equalizer (TEQ) function 24 shortens the effective channel length of the transmission channel, to ensure that the length of the cyclic prefix is at least as long as the channel response, so that the transmitted signal can be successfully recovered by FEQ function 28 without significant ISI and ICI. In conventional modem training sequences, performed upon initiation of a DSL communications session, the TEQ coefficients are optimized to reduce the channel response as much as possible. While the channel response is necessarily frequency dependent, conventional TEQ optimization is performed simultaneously over all channels. As a result, conventional TEQ optimization is not suited for optimizing the signal-to-noise performance of the subchannels. As such, conventional TEQ training does not result in optimum bitloading capacity for the DSL communications session.

It is known to define the equalization for DMT receiver systems on a per-tone basis, as described in Van Acker et al., "Per-tone Equalization for DMT-Based Systems", *IEEE Trans. on Comm.*, Vol. 49, No. 1 (IEEE, January 2001), pp. 109–119. This per-tone equalization improves the overall performance of the system, because the equalizer is defined based on the channel response for each subchannel individually. Theoretically, the per-tone equalization design can optimize the capacity of each subchannel, while still also ensuring that the channel response is minimized.

By way of further background, the theory behind the per-tone equalization described by Van Acker et al. will now be summarized. If one considers vector y to be a perfectly aligned DMT frame of N samples, with a cyclic prefix of length $\nu$ samples:

$$y = [y_0, y_1, \ldots, y_{N+\nu-2}, y_{N+\nu-1}]$$

Referring back to FIG. 1, the receipt of the frame y by receiving modem 20 is accomplished by applying TEQ function 24 to frame y. DFT function 27 demodulates this signal, and FEQ function 28 recovers an estimate Z of the originally transmitted signal. This process can be expressed by:

$$\begin{bmatrix} Z_1 \\ \vdots \\ Z_N \end{bmatrix} = \begin{bmatrix} D_1 & 0 & \cdots \\ 0 & \ddots & 0 \\ \vdots & 0 & D_N \end{bmatrix} \cdot F_N \cdot (Y \cdot w_{teq})$$

where $w_{teq} = [w_0, w_1, \ldots, w_{\nu-1}]^T$ and is the real-valued $\nu$-tap TEQ function 24. In this representation, matrix Y is the set of frames of time domain samples for the inputs of $\nu$ FFTs associated with a time t, $\nu$ being the length of the cyclic prefix and at least as large as the combined impulse response of the transmission channel and TEQ function 24:

$$Y = [y_{t,0}\ y_{t,1}\ \ldots\ y_{t,\nu-1}] = \begin{bmatrix} y_\nu & y_{\nu-1} & \cdots & y_1 \\ y_\nu & \ddots & \ddots & y_2 \\ \vdots & \ddots & \ddots & \vdots \\ y_{N+\nu-1} & y_{N+\nu-2} & \cdots & y_N \end{bmatrix}$$

The matrix $F_N$ is the N×N FFT matrix of DFT function 27, and the coefficients $D_i$ constitute the complex 1-tap FEQ function 28. This expression applies a single FFT operation $F_N \cdot (Y \cdot w_{teq})$, as known in the art. Van Ackel et al. state that one can reorder this representation of the receiver demodulation, combining the TEQ and FEQ operations:

$$Z_i = D_i \cdot \text{row}_i(F_N) \cdot (Y \cdot w_{teq}) = \text{row}_i(F_N \cdot Y) \cdot w_{teq} \cdot D_i$$

for each tone $Z_i$. In effect, by moving the FEQ $D_i$ to the right of this expression, a combined complex $\nu$-tap FEQ for the $i^{th}$ tone is derived as:

$$w_{teq} \cdot D_i = (w_{feq,i})_{\nu \times 1}$$

However, this approach requires the $\nu$ FFTs represented by $F_N \cdot Y$. According to this approach, each tone i has its own, optimized, TEQ function that is implemented in the form of a $\nu$-tap FEQ. This optimized TEQ can be determined by considering the $\nu$ FFTs of $F_N \cdot Y$ as:

$$Y_{FFT} = [y_{fft,0}\ y_{fft,1}\ \ldots\ y_{fft,\nu-1}] = F_N Y$$

and:

$$W_f = \begin{bmatrix} w^T_{feq,0} \\ w^T_{feq,1} \\ \vdots \\ w^T_{feq,N-1} \end{bmatrix} = [w_{f,0}\ w_{f,1}\ \ldots\ w_{f,\nu-1}]$$

In this approach, $y_{fft,i}$ is an N×1 vector corresponding to the FFT of the $i^{th}$ column of matrix Y. The equalizer coefficient vector $w_{f,i}$ is an N×1 vector of the $i^{th}$ equalizer coefficients for all tones.

As noted above, this approach, as described in Van Acker et al., requires $\nu$ FFTs per symbol, rather than only a single FFT operation as in the conventional approach of FIG. 1. Van Acker et al. describe, however, that the Toeplitz structure of matrix Y permits the $\nu$ FFTs to be calculated efficiently as a sliding FFT, requiring the calculation of only one full FFT, with the other $\nu-1$ FFTs calculated by:

$$y_{fft,m} = y_{fft,m-1} \otimes p + \begin{bmatrix} 1 \\ \vdots \\ 1 \end{bmatrix}_{N \times 1} \cdot (y_{t,m}(0) - y_{t,m-1}(N-1))$$

where is a component-wise multiplication and where matrix p is:

$$p = [\alpha^0\ \alpha^1\ \ldots\ \alpha^{N-1}]^T,\ \text{for}\ \alpha = e^{-j2\pi(\frac{1}{N})}$$

and for m=1, ..., $\nu-1$. The difference of $y_{t,m}(0)-y_{t,m-1}(N-1)$ is the difference between the first and last elements of $y_{t,m}$ and $y_{t,m-1}$, respectively. As a result, for each tone i, all relevant FFT elements can be derived as linear combinations of the $i^{th}$ component of the FFT of the first column of matrix Y and the $\nu-1$ difference terms $y_{t,m}(0)-y_{t,m-1}(N-1)$ for m=1, ..., $\nu-1$.

This per-tone approach is intended to optimize the signal-to-noise ratio, and thus the bit-loading, of each tone in the DMT signal. With each tone optimized for SNR, this approach theoretically optimizes the equalization and capacity performance of the entire DMT modem communications session. Simulations have been performed, in connection with this invention, that indicate that this theoretical potential can be realized.

However, it has also been observed, in connection with this invention, that the per-tone equalization approach described by Van Acker et al. is subject to several significant limitations when realizing this approach in actual DMT modems for DSL communications. A large amount of memory is required to store all of the intermediate FFT results and also the per-tone equalizer coefficients, and a high memory access bandwidth is necessary to access all of these values at a reasonable clock rate. The computational complexity for computing the v−1 sliding FFTs, especially during a DSL session in which the equalizer taps ought to be updated to account for channel variation, is also a limitation on this approach.

While the memory capacity, memory access bandwidth, and computational power constraints may become less of an issue as time passes, an insurmountable constraint is presented by the current ITU communications standards, including the G.dmt and G.dmt.bis standards (*ITU-T, G.992.1 : Asymmetrical Digital Subscriber Line (ADSL) Transceivers; ITU-T, Draft G.dmt.bis: Asymmetrical Digital Subscriber Line (ADSL) Transceivers*). According to these and previous standards, the TEQ coefficients are established early in the DSL training sequence, typically in the "Reverb" sequence that immediately follows the pilot tone, as the TEQ coefficients must be established before the "Message Exchange" sequence can be successfully performed. However, the derivation of the per-tone equalizer coefficients according to the Van Acker approach described above requires a pseudo-random sequence, which is not initiated under current standards until the "Medley" sequence, which is after the "Reverb" and "Message Exchange" sequences. As a result, per-tone equalization according to known technology is not available for DSL receiver modem architectures under current standards.

BRIEF SUMMARY OF THE INVENTION

It is therefore an object of this invention to provide a method and receiver modem system for implementing an efficient per-tone equalization scheme for DMT communications.

It is a further object of this invention to provide such a method and system that is compatible with current DMT communications standards, It is a further object of this invention to provide such a method and system that both reduces the transmission channel length, and also independently optimizes subchannel signal-to-noise and capacity performance.

It is a further object of this invention to provide such a method and system that can be realized both in software and also in hardware.

It is a further object of this invention to provide such a method and system that can be realized in software or hardware within reasonable costs in computational burden and circuitry, respectively.

Other objects and advantages of this invention will be apparent to those of ordinary skill in the art having reference to the following specification together with its drawings.

The present invention may be implemented into a Discrete Multitone (DMT) modulation receiver modem, in either dedicated or semi-dedicated hardware, or by software routines performed by a digital signal processor (DSP) or the like. A time domain equalizer function is applied to the incoming signal, with the coefficients of the time domain equalizer determined, during training, to shorten the transmission channel response. A per-tone equalizer function is then applied to the signals for some or all subchannels, with the coefficients for each tone optimized for that tone. The per-tone equalizer combines time-domain and frequency-domain equalizer functions with a sliding FFT, to faithfully produce the output symbols. In one implementation, the per-tone equalizer is applied to all tones. In another implementation, the per-tone equalizer is applied only to selected tones, specifically associated with those subchannels that are imperfectly equalized by the general time domain equalizer.

DETAILED DESCRIPTION OF THE INVENTION

Figure 1:
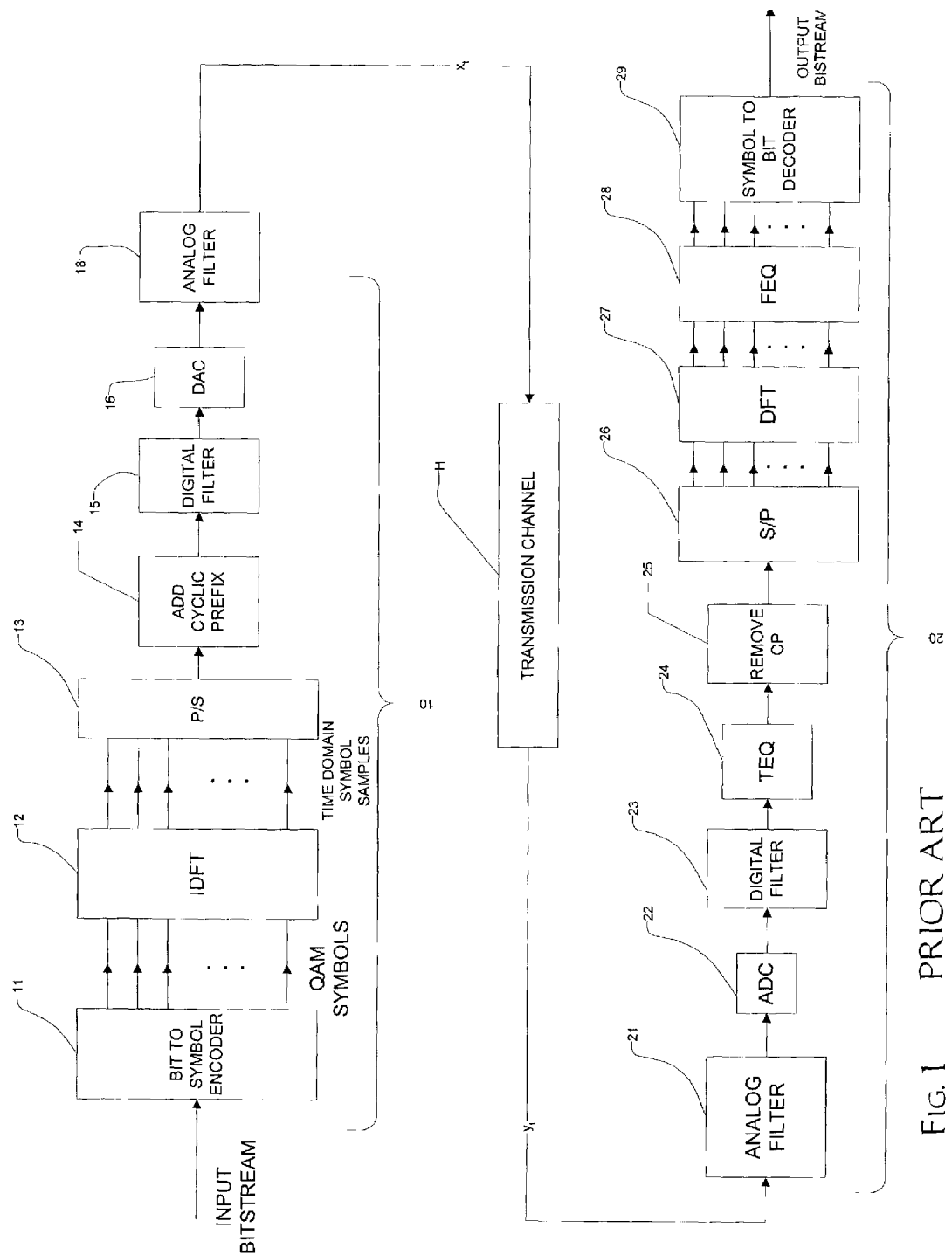
FIG. 1 is a functional block diagram illustrating conventional DSL communications between two DMT transceivers.

The present invention will be described in connection with an example of its implementation in a transceiver, such as a Digital Subscriber Line (DSL) modem. It will be apparent to those skilled in the art having reference to this specification that this invention is particularly well-suited for use in such an application. However, it is also contemplated that this invention will be of similar benefit in many other applications that involve discrete multitone modulation (DMT), including both land line and wireless communications. It is therefore to be understood that these and other alternatives to the embodiment described below are contemplated to be within the scope of the invention as claimed.

In this regard, and referring now to FIG. 2, an example of the construction of receiving modem 40 according to the preferred embodiments of the invention will now be described. Modem 40 in this example is in the form of a transceiver (i.e., for both transmitting and receiving) for DMT communications according to Digital Subscriber Line (DSL) standards. As such, modem 40 as shown in FIG. 2 may correspond to either a client side modem or to a DSL modem at the central office; while the differences in function between these applications may result in differences in the construction of the respective modems, it is contemplated that the overall hardware architecture of both the client and central office modems will still generally correspond to that illustrated in FIG. 2.

Modem 40 includes hybrid circuit 30, which is connected to a twisted-pair facility serving as transmission channel H. Hybrid circuit 30 is a conventional circuit that converts the two-wire arrangement of the twisted-pair facility to dedicated transmit and receive lines connected to line driver and receiver 32, considering that modem 20 is suitable for carrying out both receipt and transmission. Line driver and receiver 32 is a high-speed line driver and receiver for driving and receiving ADSL signals over twisted-pair lines; an example of line driver and receiver 32 is the THS7102 line driver/receiver available from Texas Instruments Incorporated. Line driver and receiver 32 is bidirectionally coupled to coder/decoder (codec) circuit 34, which carries out analog filtering, analog-to-digital conversion, and some amount of digital filtering, as will be described below. According to the preferred embodiments of the invention, the ADSL communications are carried out according to a frequency division multiplexing (FDM) scheme, in which case the upstream and downstream communications are in separate, non-overlapping, frequency bands, in which case codec circuit 34 filters the incoming downstream signal to eliminate any interference from signals that it is transmitting. An example of a suitable codec device may be selected from the TLV320AD1x device family available from Texas Instruments Incorporated. Hybrid circuit 30, line driver and receiver 32, and codec 34 are often referred to, in the aggregate, as an "analog front end".

Modem 40 also includes DSP 35, which serves as a digital transceiver for DSL communications. As noted above, DSP 35 is a high performance digital signal processor, for carrying out digital operations in response to program instructions. These digital operations include the encoding of both loaded and unloaded subchannels are encoded in the manner according to the preferred embodiments of this invention, as will be described below. Exemplary devices suitable for use as DSP 35 include DSPs having computational power similar to or greater than the TMS320c5x and TMS320c6x DSPs available from Texas Instruments Incorporated. A conventional interface 36 couples DSP 35 to its host HST, which may be a server in the central office context or a workstation on the client side.

Figure 2:
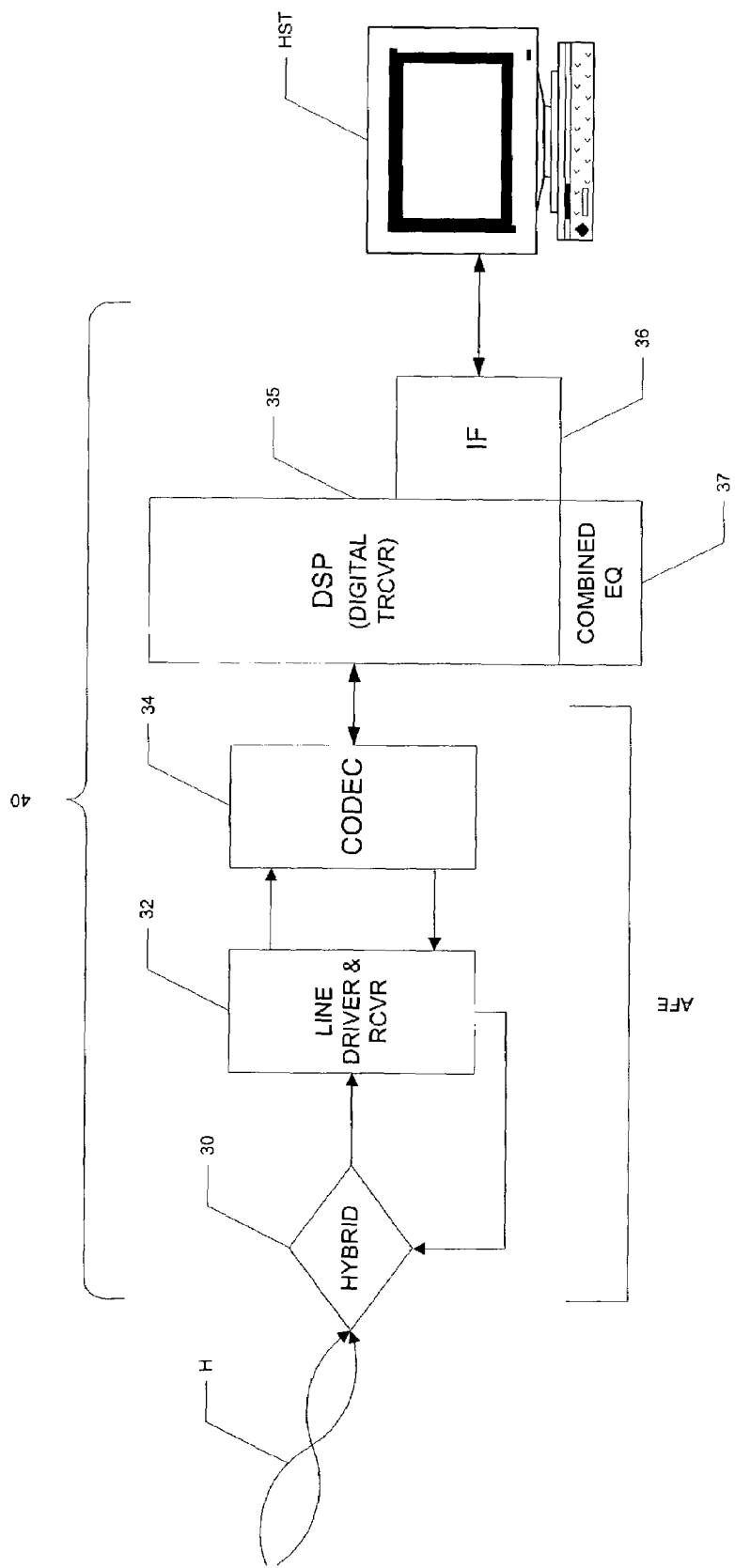
FIG. 2 is an electrical diagram, in block form, of a transceiver constructed according to the preferred embodiments of the invention.

According to the preferred embodiments of the invention, modem 40 also includes combined equalizer function 37, as shown in FIG. 2. Combined equalizer function 37 may be realized in dedicated or semi-dedicated hardware that is connected to and operates in combination with DSP 35 for processing received signals. Alternatively, combined equalizer function 37 may be realized as software routines that are executed by DSP 35 in its digital processing of the received signal, in which case combined equalizer function 37, represented in FIG. 2, will be physically realized by program instructions stored in program memory, such as read-only memory (ROM) or loadable random access memory (RAM) associated with DSP 35. It is contemplated that those skilled in the art having reference to this specification will be readily able to realize this invention in either of these forms, or as a software and hardware hybrid, suitable for the particular application.

Combined Equalization for All Tones
  Mathematical Basis

By way of further explanation of the preferred embodiment of the invention, the mathematical basis for the operation of modem 40 according to a first preferred embodiment of the invention will now be described. According to this first preferred embodiment of the invention, a conventional time domain equalizer is incorporated and trained to minimize the length of the transmission channel response, as known in the art. After the application of this time domain equalizer, a combined per-tone time domain equalization and a 1-tap frequency domain equalizer is applied, in combination with a Discrete Fourier Transform (DFT) or Fast Fourier Transform (FFT), for all of the tones in the received DMT signal. The combined equalization improves the performance of each subchannel, by applying equalization based on the frequency of the corresponding tone, at a relatively modest complexity in hardware or software.

As described in the Van Acker et al. article cited above, per-tone equalization can be considered as the sum:

$$y_{pteq,final} = \sum_{m=0}^{v-1} y_{fft,m} \otimes w_{f,m}$$

where is a component-wise multiplication, to produce the symbol vector $y_{pteq,final}$ for a given tone. As may be appreciated from this expression, one may derive the output by computing each of v FFTs to produce the vectors $y_{fft,m}$, and then apply the v equalizers $w_{f,m}$ component-by-component to each of the FFT results, summing to produce the output vector. The memory and computational requirements for this approach would be substantial for a DMT transmission of any usable complexity.

Rather, it is more efficient to derive the per-tone equalizer output in a recursive manner, for each of the v FFTs for each tone. Again using index m as the index of the multiple FFTs, a first FFT is performed upon the incoming vector $y_{t,0}$:

$$y_{fft,0} = F_N \cdot Y_{t,0}$$

where $F_N$ is the N×N FFT function. The first equalizer tap output $y_{pteq,0}$ is then obtained by the first component-wise multiplication with the equalizer filter $w_{f,0}$:

$$y_{pteq,0} = y_{fft,0} w_{f,0}$$

This operation is identical to the first FFT and equalizer component-wise multiplication in the "brute force" approach. However, the remaining v−1 FFTs for the tone can be derived from the difference of the first value in the $m^{th}$ signal vector $y_{t,m}(0)$ and the last value in the $(m-1)^{th}$ signal vector $y_{t,m-1}(N-1)$:

$$y_{fft,m} = y_{fft,m-1} \otimes p + \begin{bmatrix} 1 \\ \vdots \\ 1 \end{bmatrix}_{N \times 1} \cdot (y_{t,m}(0) - y_{t,m-1}(N-1))$$

where the matrix p is:

$$p = [\alpha^0 \ \alpha^1 \ \ldots \ \alpha^{N-1}]^T, \text{ for } \alpha = e^{-j2\pi\left(\frac{1}{N}\right)}$$

as noted above. The $m^{th}$ per-tone equalizer result $y_{pteq,m}$ is:

$$y_{pteq,m} = y_{pteq,m-1} + y_{fft,m} w_{f,m}$$

The final per-tone equalizer output vector for this tone is thus $y_{pteq,v-1}$.

This recursive calculation of the intermediate results for the FFTs and per-tone equalizer can be done with only two frame buffers, one for storing the incoming time domain samples and the other for storing the intermediate and final equalizer outputs. In addition, this recursive approach requires only a single full FFT for the first column of signal matrix Y, and storage of the v−1 sample differences. As will become apparent from the following description, the computational complexity of this operation amounts to, for each tone, one complex multiplication and two real additions to update the FFT output, and one complex multiplication and one complex addition to derive each per-tone equalizer output.

Functional Architecture

Figure 3:
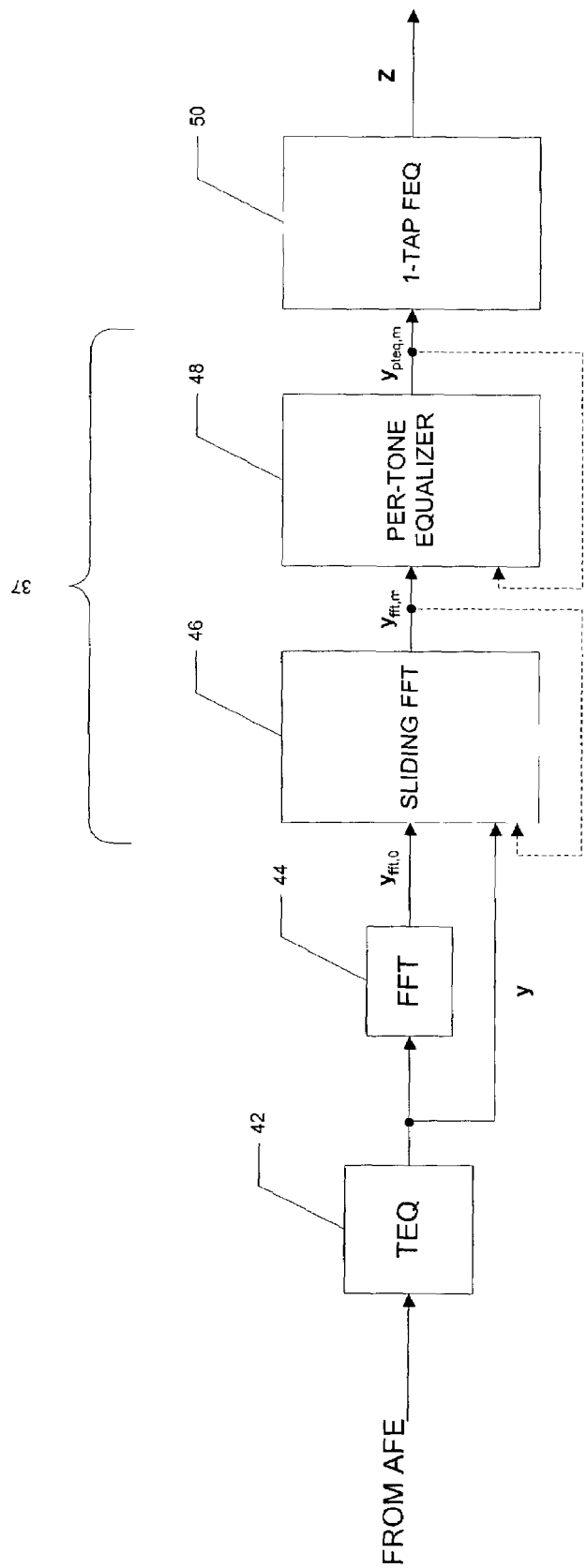
FIG. 3 is a functional block diagram illustrating the receipt of DMT communications by a receiving modem constructed according to a first preferred embodiment of the invention.

Referring now to FIG. 3, the functional architecture of combined equalizer function 37 in modem 40 in receiving and processing incoming received signals, according to a first preferred embodiment of the invention, will now be described in detail. It will be understood by those skilled in the art having reference to this specification that this functional architecture may be implemented either by specific hardware, or by software routines executed by DSP 35. The arrangement illustrated in FIG. 3 is shown on a per-tone basis, it being understood that all tones, or subchannels, of the received signal will be processed either sequentially, or in parallel if the hardware or software is arranged to permit such operation. As shown in FIG. 3, the incoming signal is received from the analog front end of the modem (AFE of FIG. 2) and is filtered by conventional time domain equalizer (TEQ) function 42. As noted above, the coefficients of TEQ function 42 are derived during training of the DSL session, to reduce the length of the transmission channel response, at least to within the length of the cyclic prefix; of course, the possibility of ISI is further reduced as the channel length is shortened beyond the cyclic prefix length. The output of TEQ function 42 is time domain vector y, which contains N+v time domain samples and is properly aligned with the DMT frame boundary. The last N samples of vector y is the vector $y_{t,0}$, which is applied to FFT function 44. Because vector $y_{t,0}$ is in the time domain, it contains components for all tones, or subchannels, in the DMT transmission. Vector $y_{t,0}$ contains N time samples, because FFT function 44 is an N×N FFT.

FFT function 42 performs the N×N FFT of vector $y_{t,0}$, producing FFT result vector $y_{fft,0}$, which is the FFT of the first N samples of the received DMT signal (i.e., typically not including the cyclic prefix). This result, along with time domain vector $y_{t,0}$ itself, is applied to sliding FFT function 46. Sliding FFT function 46 derives each of the $m^{th}$ intermediate FFT results from the operation:

$$y_{fft,m} = y_{fft,m-1} \otimes p + \begin{bmatrix} 1 \\ \vdots \\ 1 \end{bmatrix}_{N \times 1} \cdot (y_{t,m}(0) - y_{t,m-1}(N-1))$$

using the results of the $0^{th}$ FFT performed by FFT function 44 for the first iteration, and the results of the prior sliding FFT for later iterations, in combination with a difference of selected time domain samples from vector $y_{t,m}$ and $y_{t,m-1}$.

The $m^{th}$ FFT result vector $y_{fft,m}$ from sliding FFT function 46 is applied to per-tone equalizer function 48, to produce the $m^{th}$ per-tone equalizer output $y_{pteq,m}$ from the operation:

$$y_{pteq,m} = y_{pteq,m-1} + y_{fft,m} w_{f,m}$$

The values of the per-tone equalizer vector $w_{f,m}$ is derived, for each tone in the DMT communication, during the training of the DSL communications session. Preferably, these values are determined during the pseudo-random "Medley" sequence in the training carried out according to current DSL standards, as will be described below.

Sliding FFT function 46 and per-tone equalizer function 48 are preferably applied in sequence for each of the v−1 iterations (indexed by index m), to reduce the memory requirements. In this manner, only the $(m-1)^{th}$ vectors $y_{fft,m-1}$ and $y_{pteq,m-1}$ need be stored; once the $m^{th}$ iteration is complete, these $(m-1)^{th}$ vectors can be overwritten in memory.

In this architecture according to the first preferred embodiment of the invention, the final per-tone equalizer output vector $y_{pteq,v-1}$ is applied to 1-tap FEQ function 50, from which Z is retrieved. 1-tap FEQ function 50 simply applies the FEQ matrix D to derive the output symbols by:

$$Z = \begin{bmatrix} Z_1 \\ \vdots \\ Z_N \end{bmatrix} = \begin{bmatrix} D_1 & 0 & \cdots \\ 0 & \ddots & 0 \\ \vdots & 0 & D_N \end{bmatrix} \cdot y_{pteq,v-1}$$

As known in the art, the matrix elements $D_i$ are derived, during training of the DSL session, to represent the frequency-domain transmission channel response H(n). The output symbols Z are then forwarded on to the symbol-to-bit decoder and the receiving equipment, in the conventional manner.

Hardware Architecture

As noted above, the combined equalizer function 37 according this first preferred embodiment of the invention, may be implemented in hardware, as will now be described relative to FIG. 4. Incoming samples from the analog front end (AFE) are processed by TEQ block 60, which is constructed in the conventional manner to apply a time domain equalization digital filter to effectively shorten the transmission channel response. The coefficients of TEQ block 60 are determined in training to reduce the channel response, with no per-tone optimization included. The processed samples from TEQ block 60 are stored in AFE buffer 64 by AFE direct memory access (DMA) controller 62. AFE DMA controller 62 stores the processed samples in AFE buffer 64 in an aligned manner, according to frame boundaries. FFT_IN DMA controller 66 retrieves the samples from AFE buffer 64, also in an aligned manner, and stores the samples in FFT buffer 68.

FFT buffer 68 is a memory block of size N+v, where N is the number of samples in the DMT frame and v is the number of samples in the cyclic prefix; typical DMT frames according to conventional standards have N=512 and v=32, so that FFT buffer 68 has a size of 544 samples in this example. According to this embodiment of the invention, FFT buffer 68 has an output coupled to sliding FFT function 72 in per-tone equalizer block 70. EQ buffer 76 has a size of N samples, and stores the complex outputs of the per-tone equalizer operations, as will be described in further detail below. FFT buffer 68 is also connected to difference block 65, which computes the differences of time domain samples:

$$y_{t,m}(0) - y_{t,m-1}(N-1)$$

for the v−1 recursive iterations of the sliding FFT and per-tone equalizer; these differences are computed by difference block 65 and stored in FFT buffer 68 or directly forwarded to sliding FFT function 72 as needed. FFT block 67 calculates the first $(0^{th})$ FFT of time domain vector $y_{t,0}$ to produce $0^{th}$ FFT result $y_{fft,0}$, which is the FFT of the first N samples of the received DMT signal (i.e., typically not including the cyclic prefix). This result is stored in FFT buffer 68 when it is calculated.

Per-tone equalizer block 70 computes the sliding FFT and per-tone equalizer results for each of the ν−1 recursive iterations required for each frame. According to this hardware realization of the first preferred embodiment of the invention, per-tone equalizer block 70 includes sliding FFT coefficient buffer 71, and per-tone equalizer coefficients buffer 73, for storing the corresponding values of the FFT ($F_N$) and equalizer ($w_{f,m}$), respectively; the per-tone equalizer coefficient values are typically determined during the training sequences. Buffers 71, 73, as well as buffers 68, 76, may be specific memories or registers, or alternatively may be specific areas of a larger general purpose memory, accessible by the appropriate hardware, or DSP 35 as the case may be. Per-ton equalizer block 70 also includes sliding FFT block 72, and equalizer block 74, for performing the sliding FFT and per-tone equalizer derivation functions described above.

Figure 5:
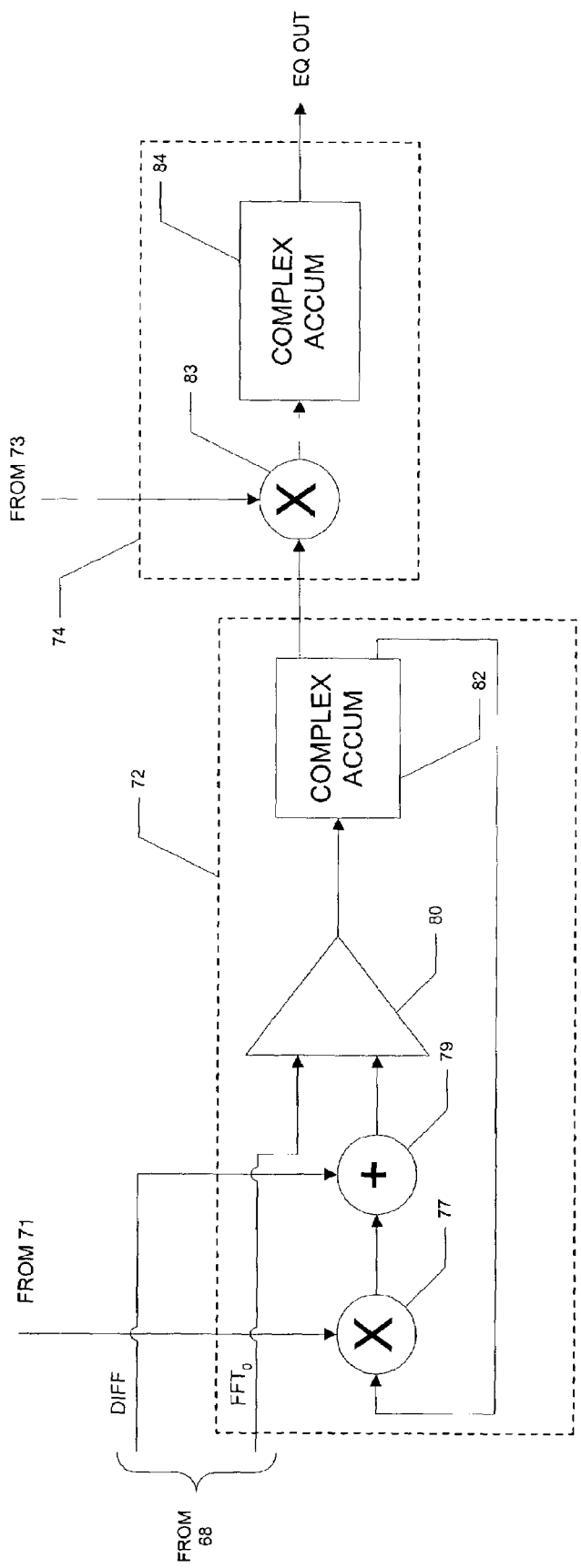
FIG. 5 is an electrical diagram, in block form, of sliding FFT and per-tone equalization functions in the architecture of FIG. 4, according to the preferred embodiments of the invention.

FIG. 5 illustrates a preferred construction for sliding FFT block 72 and equalizer block 74, according to this hardware implementation of the preferred embodiment of the invention. Sliding FFT block 72 includes complex multiplier 77, which multiplies a coefficient from sliding FFT coefficient buffer 71 with a previous output of sliding FFT block 72 itself, and applies this complex product to one input of complex adder 79. Complex adder 79 adds this product with a difference value generated by difference block 65 and stored in FFT buffer 68. This sum is applied to one input of switch 80, which receives a value from FFT buffer 68 corresponding to an initial FFT value at its other input. Switch 80 is operable to forward the initial FFT value to complex accumulator 82, for the first of the ν−1 recursive iterations of the sliding FFT, and to forward the output of complex adder 79 thereto for all other iterations. Complex accumulator 82 updates and stores the current FFT output value for the $m^{th}$ sliding FFT, forwarding this value back to complex multiplier 77 and also on to per-tone equalizer block 74.

Per-tone equalizer block 74 includes complex multiplier 83, which multiplies the current output from sliding FFT block 72 with an equalizer coefficient 73 from buffer 73. This product is accumulated in complex accumulator 84, as output EQ OUT, which is presented to a 1-tap FEQ function to recover the transmitted symbols.

In operation, FFT block 67 performs an initial FFT of the incoming time-domain vector $y_{t,0}$, storing the result in FFT buffer 68. This result is forwarded to sliding FFT block 72, and passed by switch 80 into complex accumulator 82 as the initial FFT result $y_{fft,0}$. This initial result is multiplied by the corresponding per-tone equalization coefficient $w_{f,0}$ and retained by complex accumulator 84. Following the initial per-tone equalization computation, switch 80 is configured to select the output of complex adder 79 for application to complex accumulator 82. In each of the following ν−1 recursive iterations, the contents of complex accumulator 82 are multiplied by the appropriate sliding FFT coefficient from buffer 71 in complex multiplier 77, added to the current difference of samples from difference block 65 via buffer 68, and accumulated in complex accumulator 82 to produce the sliding FFT result $y_{fft,m}$. Intermediate sliding FFT results $y_{fft,m}$ need not be written to FFT buffer 68, because each intermediate result is only needed for the current per-tone equalization and the next sliding FFT operation. This result is then multiplied by the appropriate per-tone equalization coefficient from buffer 73, in complex multiplier 84, and accumulated in complex accumulator 84. Following completion of the ν−1 recursive iterations, complex accumulator 84 is storing the final per-tone equalized vector $y_{pteq,\nu-1}$. This vector includes the per-tone equalized symbols for each tone, and is applied to a 1-tap FEQ for recovery of the transmitted symbol.

Figure 4:
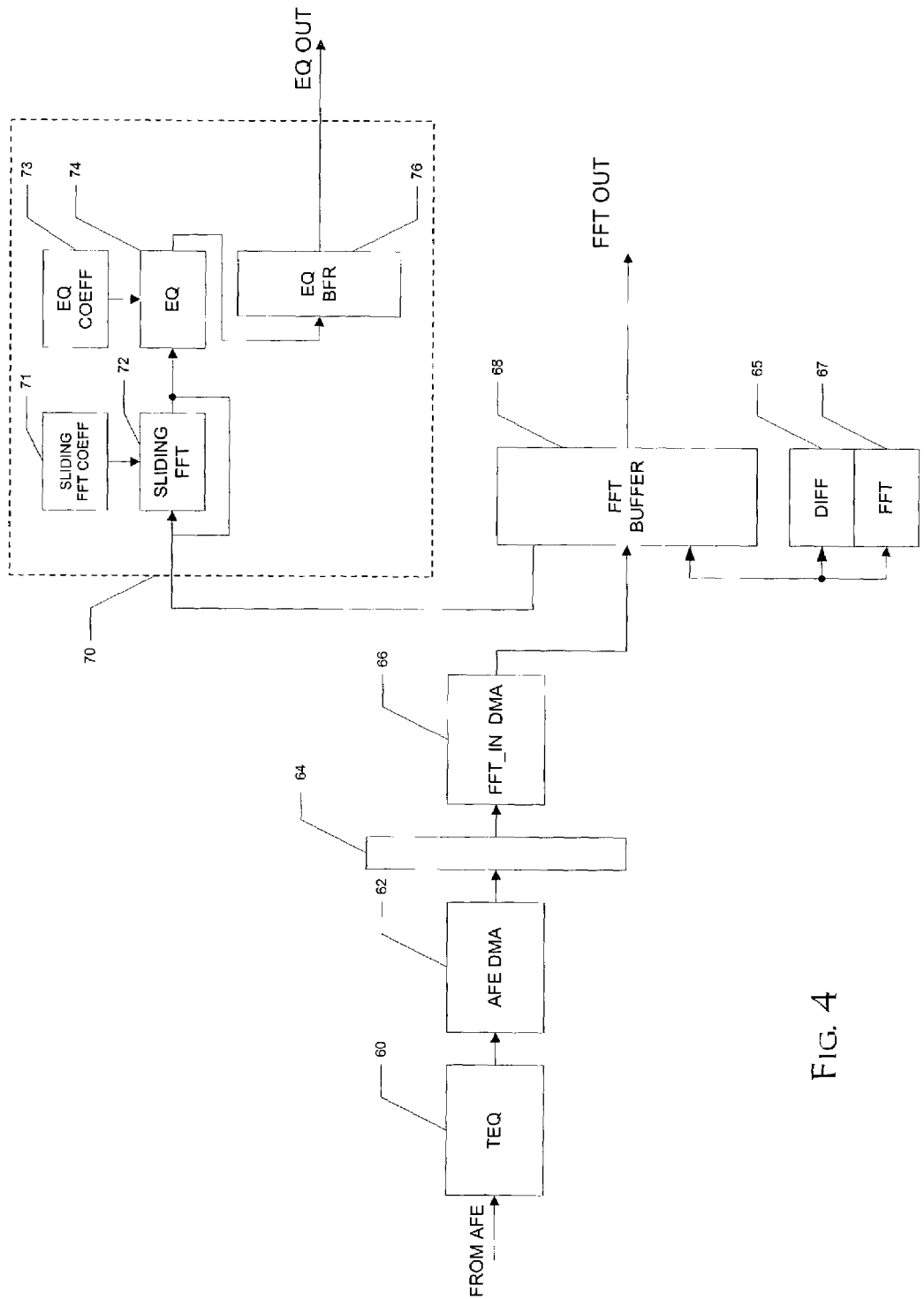
FIG. 4 is an electrical diagram, in block form, of a hardware architecture for DMT-based modems according to the preferred embodiments of the invention.

As evident from FIGS. 4 and 5, the hardware realization of the combined equalizer according to this preferred embodiment of the invention is quite efficient. The memory requirements are modest, requiring only several modest size buffers. The complexity of the computational hardware is also relatively modest, with the sliding FFT and per-tone equalizer functions requiring only two complex multipliers, a complex adder, and two complex accumulators in total. This relatively simple hardware realization enables the implementation of multiple parallel sliding FFT and per-tone equalizer blocks, permitting multiple tones to be simultaneously processed.

Software Architecture

Figure 6:
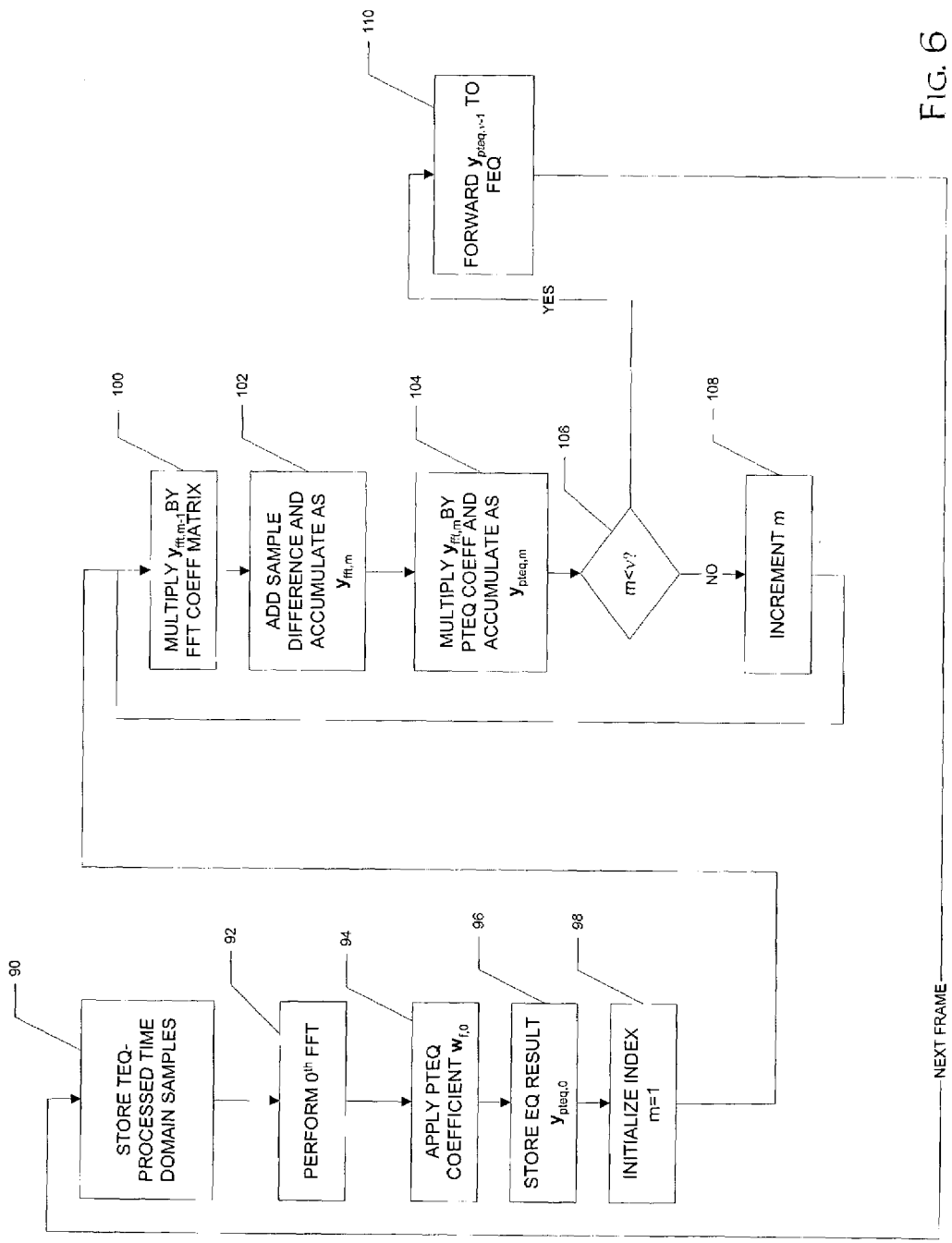
FIG. 6 is a flow diagram illustrating a method of combined per-tone equalization of DMT communications according to the first preferred embodiment of the invention.

As noted above, combined equalizer function 37 according to this first embodiment of the invention may alternatively be implemented as a software routine, executable by DSP 35 (FIG. 2) in modem 40, or by such other programmable logic suitable for these tasks. FIG. 6 illustrates such a routine, according to an exemplary implementation of such a software routine according to this embodiment of the invention. Considering that the operations required for implementing this embodiment of the invention include at least one Discrete Fourier Transform (FFT), and multiple complex multiply-and-accumulate operations, however, a programmable digital signal processor is especially well-suited as the processing unit for this embodiment of the invention.

Prior to the execution of this routine, modem 40 will have established a DSL communications session, in which the various connection-dependent parameters are established. These parameters include the coefficients for the initial non-tone-dependent time domain equalizer (TEQ function 42 of FIG. 3) for minimizing channel response length, the 1-tap frequency domain equalizer (FEQ function 50 of FIG. 3), the sliding FFT coefficients (matrix p), and the per-tone equalizer coefficients (w), as used according to this embodiment of the invention. In addition, it is contemplated that these parameters may be updated during the DSL session, by way of conventional monitoring and adjustment routines. These parameters are stored in memory accessible to DSP 35, or such other programmable logic utilized to execute the software routine of this embodiment of the invention. For purposes of this description, it will be assumed that DSP 35 is carrying out the per-tone combined equalization executed according to this embodiment of the invention.

Figure 7:
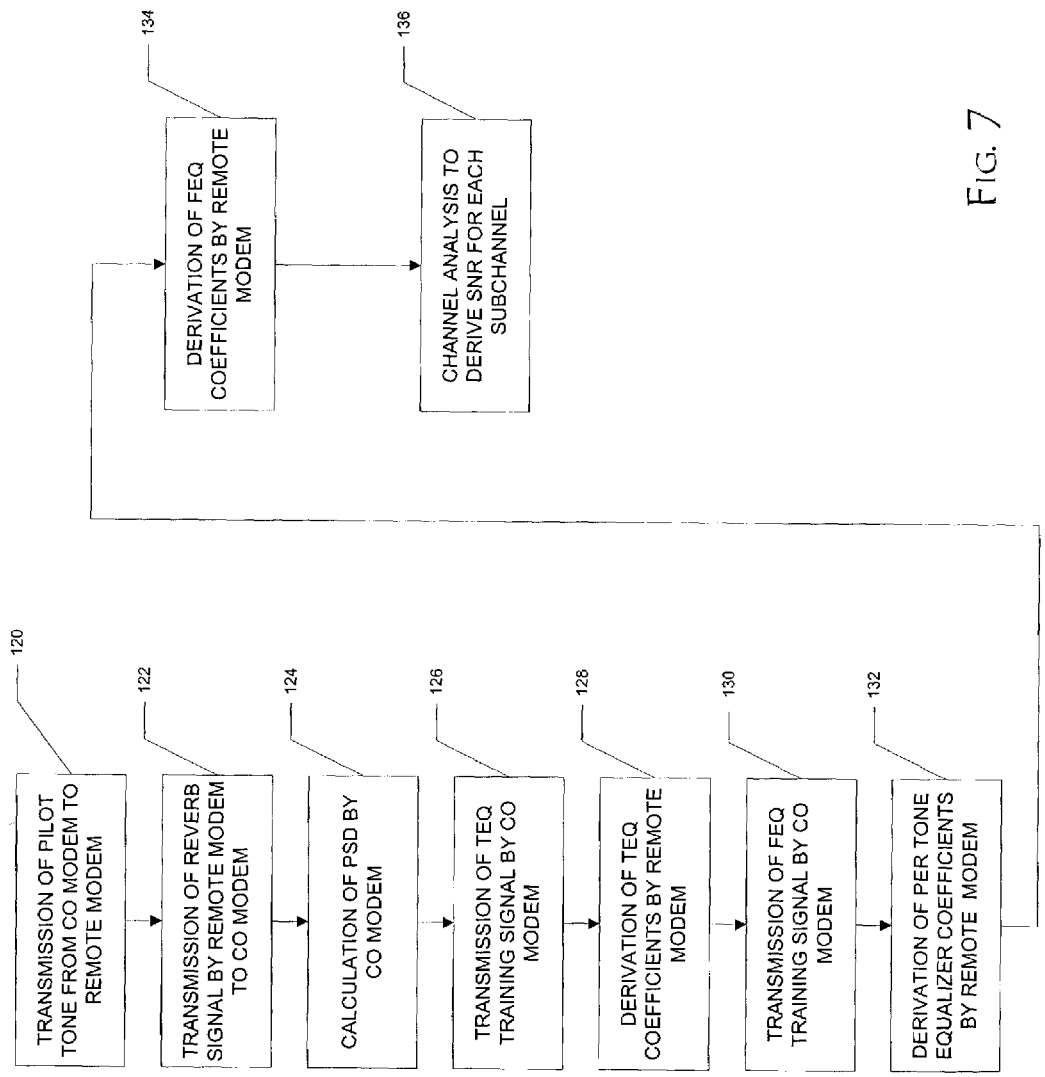
FIG. 7 is a flow diagram illustrating a training sequence executed upon initiation of a DMT communications session, according to the preferred embodiments of the invention.

FIG. 7 illustrates an exemplary training routine, for establishing these parameters in a receiving modem 40. It will be understood by those skilled in the art having reference to this specification that similar DSL session training will be performed for the hardware implementation of the per-tone equalization described above, because the particular hardware or software implementation of the combined equalization is transparent to the received signals and to the training sequences. This training sequence is carried out by bi-directional communications between a central office modem and a remote modem, either or both of which can correspond to modem 40 according to the preferred embodiments of the invention. As such, while this training process will be described under the assumption that modem 40 is the remote modem, it will of course be understood that modem 40 constructed and operating according to the preferred embodiments of the invention may also (or instead) serve as the central office modem. In addition, the training sequence of FIG. 7 will be described in a one-way fashion, by way of which remote modem 40 sets its parameters; it will be understood by those skilled in the art that similar training of the central office modem will also be carried out.

In process 120, the central office modem transmits a pilot tone to remote modem 40, generally in response to the remote modem issuing a request for DSL or other DMT communications session. The pilot tone is typically a single sinusoid; once received, remote modem 40 issues a "reverb" signal to the central office modem, in process 122. This reverb signal is used by the central office modem in process 124 to calculate the power spectrum density (PSD) to be used during communication.

Following the reverb and PSD calculation processes, the central office modem issues a TEQ training signal in process 126. Upon receipt of this signal, remote modem 40 derives the TEQ coefficients for minimizing the channel length, or at least reducing the channel length to less than the length of the cyclic prefix. Referring back to FIG. 3, these TEQ coefficients correspond to the coefficients applied by function 42. In process 130, the central office modem transmits an pseudo random signal "Medley" to remote modem 40. From this signal, modem 40 first computes and saves per-tone equalizer coefficients in process 132. The Minimum-Mean-Squared (MMSE) method can be used in deriving these equalizer coefficients. Then modem 40 derives its FEQ coefficients to be used in recovering the symbols by removing the transmission channel from the received signal, in process 134. In process 136, the central office modem and remote modem 40 carry out conventional channel analysis, to derive the signal-to-noise ratio for each tone, or subchannel, in the DMT communications.

Referring back to FIG. 6, the software routine for implementing this embodiment of the invention will now be described, assuming proper training of modem 40. This software routine utilizes the operations described above relative to the mathematical basis for this embodiment of the invention, and as such it is contemplated that the skilled artisan having reference to this specification will be able to readily implement these operations. As such, this description is presented at a relatively high level. In process 90, time domain samples $y_{t,0}$ are received from TEQ function 42 (FIG. 3), and are stored in memory. In process 92, the $0^{th}$ FFT of these time domain samples is performed, by way of a conventional DFT or FFT routine, to produce initial FFT results $y_{fft,0}$, which are also stored in memory. The initial pass of per-tone equalization (PTEQ) is performed in process 94, by the complex multiplication of results $y_{fft,0}$ with the appropriate per-tone equalizer coefficient vector $w_{f,0}$ for the N tones resulting from the FFT. The result of this equalization process 94 is stored in memory as result vector $y_{pteq,0}$ for all tones.

Upon initializing of index m to the value 1 (process 98), the ν−1 recursive iterations of the sliding FFT and per-tone equalization of this embodiment of the invention are performed. For the $m^{th}$ iteration, process 100 multiplies the previous FFT output $y_{fft,m-1}$, whether from the $0^{th}$ FFT of process 92 (for m=1) or from a previous iteration (for m>1), by the appropriate FFT coefficient matrix p as defined above. In process 102, the sample difference $y_{t,m}(0)-y_{t,m-1}(N-1)$ is added to the result of process 100, and accumulated in a memory location as the current sliding FFT result $y_{fft,m}$. This result is used in the next iteration of processes 100, 102.

In process 104, current sliding FFT result $y_{fft,m}$ is multiplied by the corresponding per-tone equalizer coefficient $w_{f,m}$, and accumulated in memory with the prior per-tone equalizer result $y_{pteq,m-1}$ to produce a current per-tone equalizer result $y_{pteq,m}$. Decision 106 next determines whether additional ones of the ν−1 recursive iterations of the sliding FFT and per-tone equalization remain, by comparing the current value of index m to terminal value ν−1. If index m has not yet reached the terminal value (decision 106 is NO), index m is incremented in process 108, and the next iteration of sliding FFT and per-tone equalization is performed, beginning again with process 100.

Upon index m reaching the terminal value ν−1 (decision 106 is YES), the frame corresponding to time domain vector $y_{t,0}$ has been fully equalized. The final per-tone equalization result $y_{pteq,ν−1}$ that is stored in memory is the equalized signal vector, now in the frequency domain. This signal vector is forwarded to a 1-tap FEQ (FEQ function 50 of FIG. 3) for recovery of the transmitted symbols for each of the tones, in process 110. The next frame is then received and stored in process 90, and the routine is repeated so long as communications continue.

According to this preferred embodiment of the invention, whether implemented in hardware or software, each of the tones present in the received DMT signal are equalized, on a per-tone basis, with equalization coefficients that are optimized specifically for the frequencies associated with that tone. This per-tone equalization is performed in an efficient manner, whether by dedicated or semi-dedicated hardware, or as a software routine executed by a DSP. The implementation of per-tone equalization in this manner not only permits time domain equalization to be carried out in the conventional manner, to shorten the channel response to a length at or shorter than that of the cyclic prefix, but also enables frequency-dependent, per-tone, equalization to be applied to each tone or subchannel. This approach therefore optimizes the signal-to-noise characteristics of each tone for that tone alone, maximizing its performance and bit-loading with only a modest increase in implementation complexity.

Combined Equalization for Specific Tones

It is contemplated that, in many DSL deployments, not all tones within the DMT bandwidth may require or even benefit from per-tone equalization. Rather, it has been observed that the ISI and ICI characteristics are often dominated by one or a few tones, with the characteristics of these tones dominating the training of the general TEQ function, but still not resulting in complete equalization of those troublesome tones.

Mathematical Basis

According to a second preferred embodiment of the invention, only certain ones of the tones have combined equalization applied; the other tones are sufficiently equalized by the conventional TEQ and FEQ functions that additional per-tone equalization is not useful. In this approach, the result $y_{fft,0}$ of the initial FFT of the time domain vector $y_{t,0}$ is processed tone-by-tone for those tones that require per-tone equalization. For those tones that do not receive per-tone equalization, the output signal applied to the 1-tap FEQ is simply the corresponding row of FFT result $y_{fft,0}$.

Analogously to the approach described above, per-tone equalization can be described, where k is the index for individual tones in the DMT signal, as:

For m=0:

$$y_{fft,0} = F_N \cdot y_{t,0}$$

$$y_{pteq,0}[k] = y_{fft,0}[k] \cdot w_{f,0}[k]$$

For m=1, ..., ν−1:

$$y_{fft,m}[k] = y_{fft,m-1}[k] \cdot \alpha^k + (y_{t,m}(0) - y_{t,m-1}(N-1))$$

$$y_{pteq,m}[k] = y_{pteq,m-1}[k] + y_{fft,m}[k] \cdot w_{f,m}[k]$$

These representations are equivalent to those described above for the all-tone per-tone equalization approach of the first embodiment of the invention, considering that the term $a^k$ is the constituent of matrix p applied simultaneously to all tones in the first preferred embodiment of the invention, as described above. As indicated in these expressions, however, the sliding intermediate FFT result $y_{fft,m}[k]$ is updated individually by tone, and the intermediate per-tone equalizer results $y_{pteq,m}[k]$ are determined recursively for those selected tones k, with $y_{pteq,v-1}[k]$ being the final per-tone equalizer result for tone k. In summary, the output symbol $Z_i$ from the 1-tap FEQ, for all tones i that are applied to the per-tone equalizer, is:

$$Z_i = D_i \cdot y_{pteq,v-1}[i]$$

and for those tones j that are not applied to the per-tone equalizer:

$$Z_j = D_j \cdot y_{fft,0}[j]$$

which is simply the result of applying the 1-tap FEQ to the FFT output.

Functional Architecture

Figure 8:
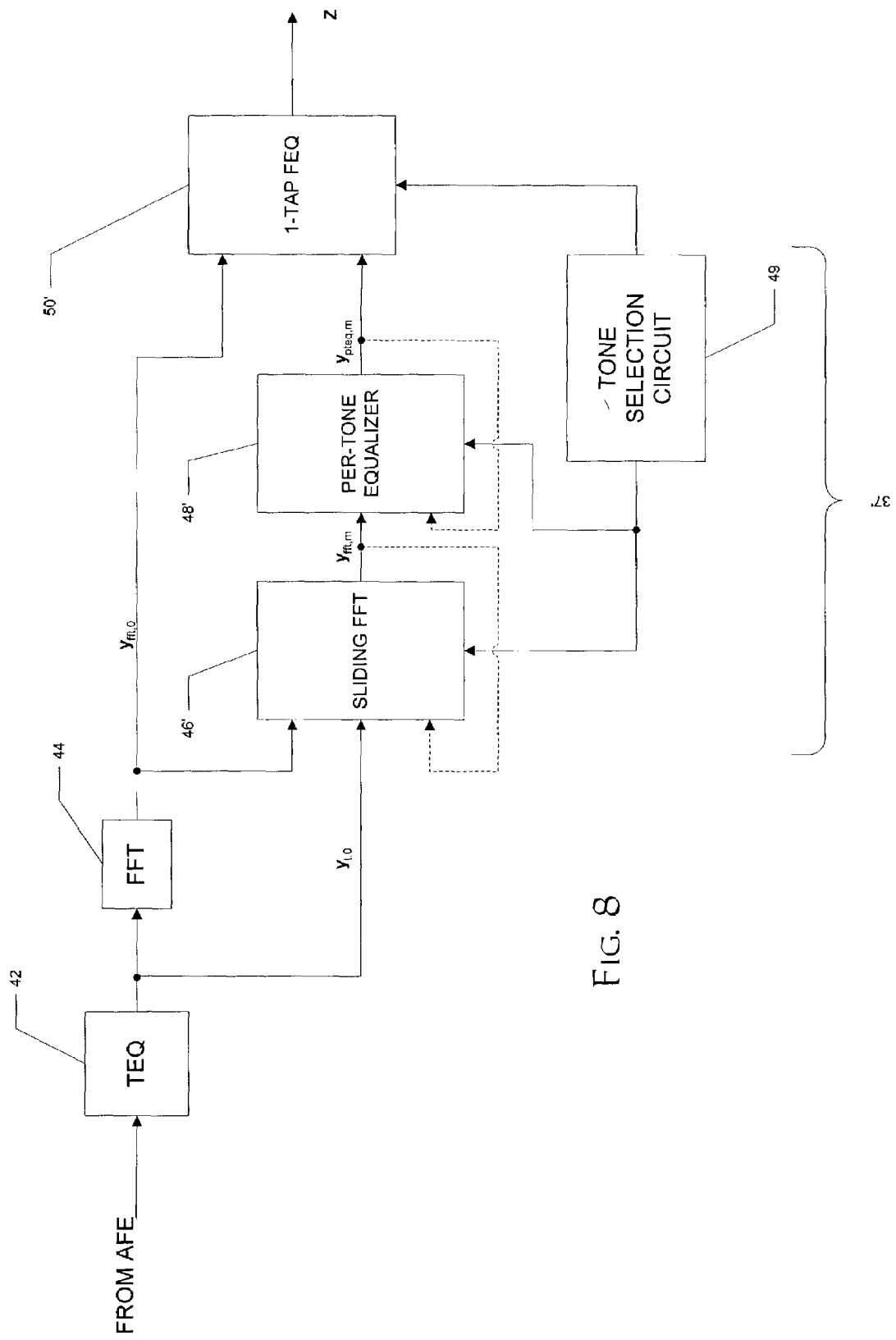
FIG. 8 is a functional block diagram illustrating the receipt of DMT communications by a receiving modem constructed according to a second preferred embodiment of the invention.

FIG. 8 illustrates the functional architecture of the digital processing portion of modem 40, in which combined equalizer function 37' according to this second preferred embodiment of the invention is incorporated. Similar functions in FIG. 8 to those of FIG. 3 are referred to by similar reference numerals. As in the first embodiment of the invention, the incoming time-domain signal is received from the AFE by TEQ function 42, by way of which the effective channel response length is reduced. Equalized time-domain vector $y_{t,0}$ is then applied to FFT function 44, which performs a full N×N FFT or DFT, producing initial FFT result $y_{fft,0}$. FFT result $y_{fft,0}$ and time-domain vector $y_{t,0}$ are both applied to sliding FFT function 46'. According to this embodiment of the invention, FFT result $y_{fft,0}$ is also applied directly to 1-tap FEQ function 50', from which the output symbols are recovered for those tones not requiring per-tone equalization.

Sliding FFT function 46' and per-tone equalizer 48' operate as combined equalizer function 37' to produce the per-tone equalized output $y_{pteq,m}$ as before, with this output being applied to 1-tap FEQ function 50'. However, tone selection circuit 49 is provided to control sliding FFT function 46' and per-tone equalizer 48' to only operate upon those tones that require per-tone equalization. In other words, sliding FFT function 46' and per-tone equalizer 48' are implemented to operate on a tone-by-tone basis, under the control of tone selection circuit 49. At the output, 1-tap FEQ function 50' is controlled by tone selection circuit 49 to recover symbols Z directly from the output of FFT function 44 for those tones that do not require per-tone equalization, and to recover symbols Z from the output of per-tone equalizer 48' for those tones that do require per-tone equalization. The selection of which tones are to receive which treatment is preferably determined during training of the DSL session, for example after the per-tone equalizer coefficients or some other measure of goodness are derived for each tone, and compared against a threshold value.

Hardware Architecture

It is contemplated that the hardware realization of combined equalizer function 37' according to this second preferred embodiment of the invention will be substantially identical to that described above relative to FIGS. 4 and 5. Control circuitry (not shown) having the function of tone selection circuit 49 of FIG. 8 will be provided to control the operation of per tone equalizer block 70, so that those tones that are not to receive per-tone equalization need not be processed by block 70. In addition, the downstream 1-tap FEQ (not shown in FIG. 4) will receive signals on both of line EQ OUT and also from FFT OUT, with the control circuitry (not shown) controlling the 1-tap FEQ to use the appropriate signal in its symbol recovery process. It is contemplated that those skilled in the art having reference to this specification will be readily able to realize such a hardware implementation of this second preferred embodiment of the invention.

Software Architecture

Figure 9:
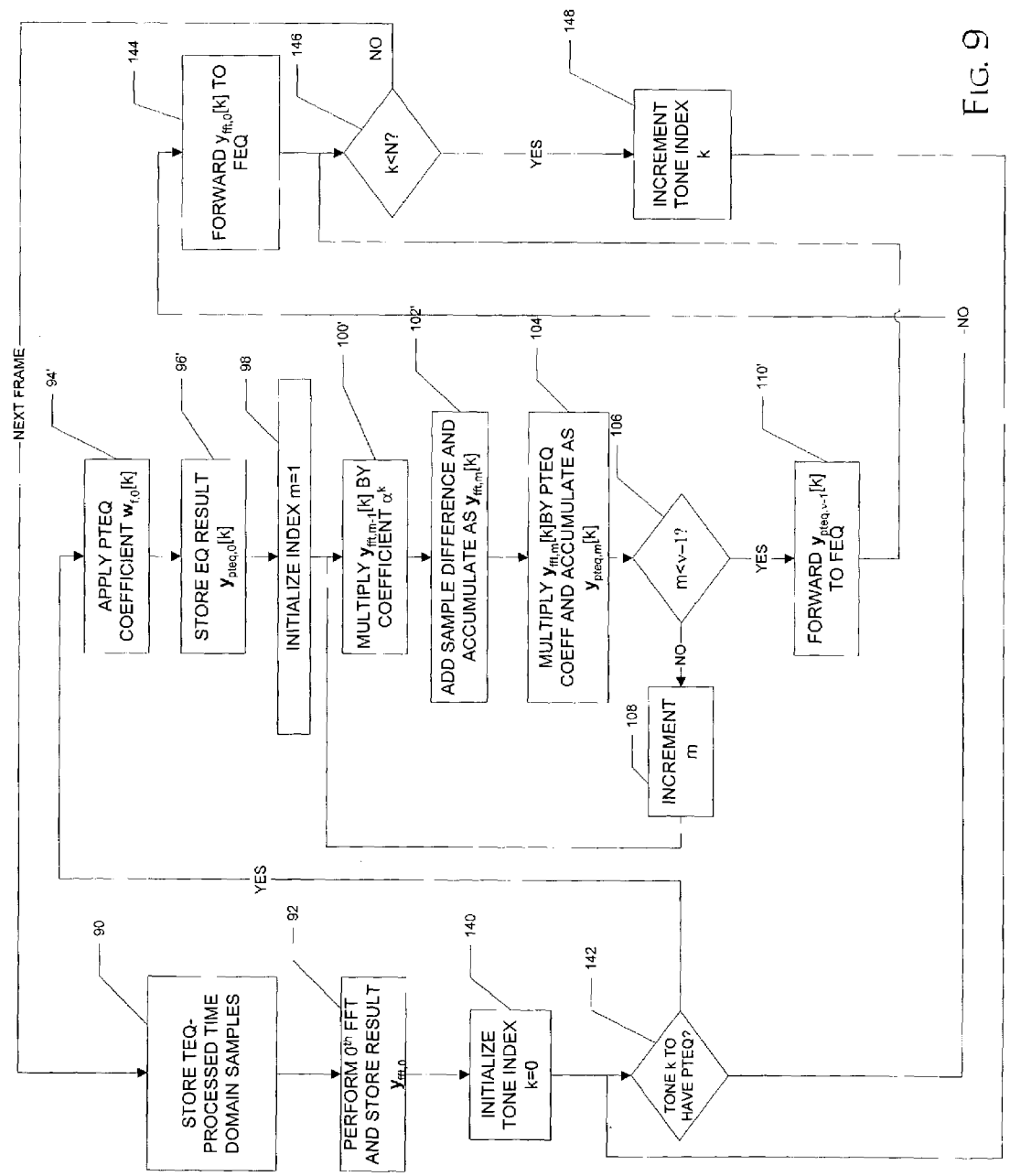
FIG. 9 is a flow diagram illustrating the equalization of DMT communications according to the second preferred embodiment of the invention.

Referring now to FIG. 9, an example of a software implementation of combined equalizer function 37' according to this second preferred embodiment of the invention will now be described. Similar functions in this implementation of FIG. 9 will be referred to by the same reference numerals as in the first preferred embodiment of the invention shown in FIG. 6. Also as in the first preferred embodiment of the invention, the software routine to be described in connection with this embodiment of the invention is contemplated to be executed by DSP 35 in modem 40, or by other such programmable logic circuitry as may be appropriate for the DMT modem receiving functions.

Prior to the execution of the software routine of FIG. 9 for payload frames, the various FFT and equalizer parameters and coefficients will have already been determined in a training sequence, for example as described above relative to FIG. 7. In addition, modem 40 also determines which of the N tones are to receive per-tone equalization according to this embodiment of the invention, and which tones are not to receive such equalization. This decision (not shown in FIG. 9) may be made according to various criteria. For example, a threshold value of signal-to-noise ratio or other subchannel performance measure may be used to identify those subchannels having the poorest performance, thus identifying those tones, if any, that are to receive per-tone equalization. Alternatively, the signal-to-noise ratios for both TEQ only and combined TEQ/per tone equalizer cases can be calculated during training. The decision for enabling per tone equalizer for certain tones can be made based on which case provides better performance for each tone. Other decision criteria for selecting the tones to be so processed will be apparent to those skilled in the art having reference to this specification. In any event, modem 40 stores a list of those tones that are to receive per-tone equalization, in a memory or register location available to DSP 35 or such other circuitry that is carrying out this process.

Referring to FIG. 9, the initial processes in this routine are similar to those described above relative to the first embodiment of the invention. In summary, time domain samples $y_{t,0}$ are received from TEQ function 42 (FIG. 3) and are stored in memory, in process 90. The $0^{th}$ FFT of these time domain samples is performed in process 92, by way of a conventional DFT or FFT routine, to produce initial FFT results $y_{fft,0}$, which are also stored in memory.

In process 140, tone index k is initialized to zero for the processing of this frame. Decision 142 next compares the current value of tone index k to its stored list or flag register to determine whether the current tone to be processed is to receive per-tone equalization. If so (decision 142 is YES), per-tone equalization is carried out for tone k in substantially the same manner as described above relative to FIG. 6, except only for the individual tone k.

In this embodiment of the invention, an initial pass of per-tone equalization (PTEQ) is performed in process 94', by the complex multiplication of results $y_{fft,0}$ for tone k with the appropriate per-tone equalizer coefficient vector $w_{f,0}[k]$. The result of this equalization process 94' is stored in memory as result $y_{pteq,0}[k]$ for that tone.

Index m is initialized to the value 1 (process 98), and the ν−1 recursive iterations of the sliding FFT and per-tone equalization for tone k are performed. For the $m^{th}$ iteration, process 100' multiplies the previous FFT output $y_{fft,m-1}$, whether from the $0^{th}$ FFT of process 92 (for m=1) or from a previous iteration (for m>1), by the appropriate coefficient $a^k$ defined above. In process 102', the sample difference $y_{t,m}(0)-y_{t,m-1}(N-1)$ is added to the result of process 100', and accumulated in a memory location as the current sliding FFT result $y_{fft,m}[k]$. This result is used in the next iteration of processes 100', 102'. Process 104' multiples the current sliding FFT result $y_{fft,m}[k]$ by the corresponding per-tone equalizer coefficient $w_{f,m}[k]$ and accumulated in memory with the prior per-tone equalizer result $y_{pteq,m-1}[k]$ to produce a current per-tone equalizer result $y_{pteq,m}[k]$.

As before, decision 106 next determines whether additional ones of the ν−1 recursive iterations of the sliding FFT and per-tone equalization remain for tone k, by comparing the current value of index m to terminal value ν−1. If index m has not yet reached the terminal value (decision 106 is NO), index m is incremented in process 108, and the next iteration of sliding FFT and per-tone equalization is performed for this tone k, beginning again with process 100'. Upon index m reaching the terminal value ν−1 (decision 106 is YES), the frame corresponding to time domain vector $y_{t,0}$ has been fully equalized for this single tone k. The final per-tone equalization result $y_{pteq,\nu-1}[k]$ is stored in memory is the equalized signal for this tone, and is forwarded to a 1-tap FEQ (FEQ function 50 of FIG. 3) for recovery of the transmitted symbols for that tone k, in process 110.

If, on the other hand, the current tone k is not to receive per-tone equalization (decision 142 is NO), control passes to process 144, in which the output $y_{fft,0}[k]$ of FFT process 92 for tone k is forwarded to the 1-tap FEQ. In this case, the entirety of the per-tone equalization process (processes 94' through 110') are not performed for this tone k, saving significant computational and memory resources.

In either case, once the appropriate result $y_{fft,0}[k]$ or $y_{pteq,\nu-1}[k]$ is forwarded to the 1-tap FEQ, decision 146 is performed to determine whether additional tones remain to be processed for the current frame. For a typical N×N FFT, with N subchannels available in the DMT transmission, decision 146 is performed by comparing the current value of tone k to N. If additional tones remain to be processed (decision 146 is YES), tone index k is incremented in process 148, and control passes back to decision 142 to determine whether this next tone k is to receive per-tone equalization, as before. If all tones are completed for this frame (decision 146 is NO), the next frame is then received and stored in process 90, and the routine is repeated so long as communications continue.

According to this second preferred embodiment of the invention, which may be implemented either by hardware or in a software routine, selected ones of the tones of the received DMT signal are equalized, with equalization coefficients that are optimized specifically for the frequencies associated with that tone. While per-tone equalization for those selected tones is performed in a relatively efficient manner according to this embodiment of the invention, the computational efficiencies are still further improved by only performing per-tone equalization for those tones that are sufficiently noisy or inadequately equalized by the conventional TEQ. This selectability renders the receipt of DMT communications even more efficient.

According to this invention in general, as evident from the preferred embodiments described above, an efficient approach to per-tone equalization is provided. Time-domain equalization to reduce the transmission channel length is therefore supplemented with a combined equalization approach that accounts for frequency-dependent effects of the transmission channel. Performance of each subchannel can therefore be optimized, tone by tone. In addition, this invention enables the implementation of per-tone equalization in a manner that is compatible with DSL training sequences according to current standards.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as claimed.

We claim:

1. A method of demodulating a received Discrete Multi-tone (DMT) signal, comprising:
   applying a first time-domain equalizer to the received signal to produce an equalized time domain sampled signal arranged in frames;
   performing a first Discrete Fourier Transform on the equalized time-domain sampled signal to produce an initial transform result;
   applying a sliding transform matrix to a subset of the initial transform result;
   adding a difference between selected samples of the equalized time domain sampled signal to the result of the applying a sliding transform matrix step to produce an accumulated sum;
   multiplying the accumulated sum by a per-tone equalizer coefficient;
   shifting the subset of the initial transform result by a sample position;
   repeating the applying a sliding transform matrix step adding, multiplying, and shifting steps for a plurality of iterations wherein the rereated multiplying step comprises producing an accumulated result by accumulating result of repeated multiplying step with result of a previous multiplying step; and
   applying a frequency domain equalizer to a last accumulated per-tone equalizer result to recover an estimate of a frame of the DMT signal.

2. The method of claim 1, wherein the repeated applying, adding, multiplying, and shifting steps are performed for all tones of the DMT signal.

3. The method of claim 2, further comprising:
   after the step of performing the first Discrete Fourier Transform, applying per-tone equalizer coefficients to the initial transform result to produce an initial per-tone equalizer result.

4. The method of claim 1, wherein the repeated applying, adding, multiplying, and shifting steps are performed for one or more selected tones of the DMT signal.

5. The method of claim 4, further comprising:
storing identification of the selected tones of the DMT signal for which the repeated applying, adding, multiplying, and shifting steps are to be performed;
initializing a tone index;
responsive to a current tone index value corresponding to a selected tone, performing the repeated applying, adding, multiplying, and shifting steps for the component of the initial transform result corresponding to the selected tone, to produce a last accumulated per-tone equalizer result for the selected tone;
incrementing the tone index; and
repeating the performing of the repeated applying, adding, multiplying, and shifting steps until the tone index reaches a terminal value;
wherein the step of applying a frequency domain equalizer comprises:
responsive to the current tone index value corresponding to the selected tone, applying the frequency domain equalizer to the last accumulated per-tone equalizer result for the selected tone and
responsive to a current index value corresponding to a tone that is not selected, applying the frequency domain equalizer to the initial transform result for the tone.

6. The method of claim 1, further comprising:
storing a frame of the equalized time domain sampled signal in a first buffer; and
storing the initial transform result in a second buffer;
wherein the adding and accumulating steps comprise:
adding the accumulated sum to a previous transform result to produce an updated accumulated sum; and
storing the accumulated sum in a third buffer.

7. The method of claim 6, further comprising:
storing the accumulated per-tone equalizer results in a third buffer.

8. A DMT modem, comprising:
analog front end circuitry, for receiving analog signals from a communications facility and for converting the received analog signals into a digital data stream of time domain sample values; and
digital circuitry for demodulating the digital data stream into an output bitstream, comprising:
a digital time domain equalizer function for applying a digital filter to effectively reduce an impulse response of a transmission channel;
an FFT function for performing a Fast Fourier Transform upon time domain samples from the time domain equalizer function;
a sliding FFT function for applying a sliding Fast Fourier Transform to differences between time domain samples and to prior FFT results;
a per-tone equalizer function, for applying per-tone equalizer coefficients to results of the sliding FFT function; and
a frequency domain equalizer, for recovering data symbols from an output of the per-tone equalizer function, wherein the sliding FFT function comprises:
a first complex multiplier having an input coupled to a sliding FFT coefficient buffer and having a feedback input;
a complex adder having an input coupled to the sliding coefficient buffer for receiving a difference result, and having an input coupled to the first complex multiplier, wherein the difference result is a difference between selected time domain samples; and
a first complex accumulator, for accumulating results of the complex adder, wherein the first complex accumulator provides a feedback on the feedback input of the first complex multiplier.

9. The DMT modem of claim 8, wherein the digital circuitry comprises a digital signal processor, operable responsive to program instructions.

10. The DMT modem of claim 8, wherein the sliding FFT function further comprises:
a switch for forwarding an initial FFT result to the first complex accumulator in an initial accumulation, and for then forwarding the output of the complex adder to the complex accumulator for subsequent accumulations, wherein the switch having a first input coupled to the FFT buffer to receive the initial FFT result and having a second input coupled to the output of the complex adder.

11. The DMT modem of claim 8, wherein the equalizer function comprises:
a second complex multiplier, having an input coupled to the output of the complex accumulator of the sliding FFT function, and having an input coupled to the equalizer coefficient buffer; and
a second complex accumulator, for accumulating results from the second complex multiplier.

12. The DMT modem of claim 8, wherein the frequency domain equalizer is coupled to the per-tone equalizer function and to the FFT function;
and further comprising:
a tone selection circuit, for applying results of the per-tone equalizer to the frequency domain equalizer for at least one selected tone in a DMT signal, and for applying results of the FFT function to the frequency domain equalizer for tones in the DMT signal other than the at least one selected tone.

13. The modem of claim 8, wherein the digital circuitry further comprises:
an FFT buffer for storing a frame of time domain samples and for storing FFT results and difference results;
a difference function for determining a difference between time domain samples and storing the difference result in the FFT buffer;
a sliding FFT coefficient buffer for storing sliding FFT coefficients applied by the sliding FFT function;
an equalizer coefficient buffer for storing per-tone equalizer coefficients applied by the per-tone equalizer function; and
an equalizer buffer for storing per-tone equalizer results;.

14. A Discrete Multi-Tone (DMT) modem, comprising:
analog front end circuitry, for receiving analog signals from a communications facility and for converting the received analog signals into a digital data stream of time domain sample values; and
a digital signal processor, programmed to perform a sequence of operations comprising:
applying a first time-domain equalizer to the digital data stream of time domain sample values to produce an equalized time domain sampled signal arranged in frames;
performing a first Discrete Fourier Transform on the equalized time-domain sampled signal to produce an initial transform result;
applying a sliding transform matrix to a subset of the initial transform result;
adding a difference between selected samples of the equalized time domain sampled signal to the result of the applying step to produce an accumulated sum;

multiplying the accumulated sum by a per-tone equalizer coefficient;

shifting the subset of the initial transform result by a sample position;

repeating the applying a sliding transform matrix, adding, multiplying, and shifting steps for a plurality of iterations wherein the repeated multiplying step comprises producing an accumulated result by accumulating result of repeated multiplying step with result of a previous multiplying step; and applying a frequency domain equalizer to the last accumulated per-tone equalizer result to recover an estimate of a frame of the DMT signal.

15. The modem of claim 14, wherein the repeated applying, adding, multiplying, and shifting operations are performed for all tones of the DMT signal.

16. The modem of claim 14, wherein the repeated applying, adding, multiplying, and shifting operations are performed for one or more selected tones of the DMT signal.

17. The modem of claim 16, further comprising:
storing identification of the selected tones of the DMT signal for which the repeated applying, adding, multiplying, and shifting steps are to be performed;
initializing a tone index;
responsive to a current tone index value corresponding to a selected tone, performing the repeated applying, adding, multiplying, and shifting steps for the component of the initial transform result corresponding to the selected tone, to produce a last accumulated per-tone equalizer result for the selected tone;
incrementing the tone index; and
repeating the performing of the repeated applying, adding, multiplying, and shifting steps until the tone index reaches a terminal value;
wherein the step of applying a frequency domain equalizer comprises:
responsive to the current tone index value corresponding to the selected tone, applying the frequency domain equalizer to the last accumulated per-tone equalizer result for the tone; and
responsive to a current tone index value corresponding to a tone that is not selected, applying the frequency domain equalizer to the initial transform result for the tone.

18. The modem of claim 14, further comprising:
storing a frame of the equalized time domain sampled signal in a first buffer; and
storing the initial transform result in a second buffer;
wherein the adding and accumulating steps comprise:
adding the accumulated sum to a previous transform result to produce an updated accumulated sum; and
storing the accumulated sum in a third buffer.

* * * * *